United States Patent [19]
Phipps

[11] Patent Number: 6,007,047
[45] Date of Patent: Dec. 28, 1999

[54] ROTARY ACTUATOR FOR STEM VALVES

[76] Inventor: Jack M. Phipps, 1901 State St., Garland, Tex. 75042-6773

[21] Appl. No.: 09/090,977

[22] Filed: Jun. 5, 1998

[51] Int. Cl.[6] .......................... F16K 31/04; F16K 31/528
[52] U.S. Cl. .................... 251/252; 251/129.01; 251/229; 251/291; 74/25; 74/57
[58] Field of Search ................ 251/56, 58, 229, 251/252, 129.01, 129.11, 129.12, 129.13, 291, 292; 74/25, 57

[56] References Cited

U.S. PATENT DOCUMENTS

| | | | |
|---|---|---|---|
| 1,155,576 | 10/1915 | Isley | 251/252 |
| 3,046,802 | 7/1962 | Cupedo | 251/252 |
| 3,450,382 | 6/1969 | Calim | 251/58 |
| 3,492,880 | 2/1970 | Pearson | 251/58 |
| 4,293,117 | 10/1981 | Mueller | 251/252 |
| 4,350,322 | 9/1982 | Mueller | 251/252 |
| 4,436,280 | 3/1984 | Geisow | 251/252 |
| 4,666,124 | 5/1987 | Giacobbi | 251/252 |
| 5,005,805 | 4/1991 | Morris et al. | 251/252 |
| 5,108,073 | 4/1992 | Adachi | 251/252 |

FOREIGN PATENT DOCUMENTS 2062871  7/1991  Germany ............................... 251/252

Primary Examiner—George L. Walton
Attorney, Agent, or Firm—Shlesinger, Arkwright & Garvey LLP

[57] ABSTRACT

A device for actuating a valve including a body having a slot therein. A pin is positioned within the slot, and the pin is attachable to a valve stem of a valve, whereby when the valve stem is attached to the pin and the pin is moved within the slot, the valve stem moves therewith and actuates the valve. There is also a rotary actuator assembly including a rotary actuator, a body having a chamber therein attached to the actuator, and a valve associated therewith. A slot is provided in part of the chamber, and a pin extends through the slot for guiding movement of the valve stem of the valve when the valve stem is attached to the pin and the rotary actuator is actuated. The slot may be configured as a helical slot. A piston may be provided between the valve stem and the pin. The configuration of the slot may be varied for changing the length of movement of the pin, so as to change the length of movement of a valve stem attached thereto.

13 Claims, 4 Drawing Sheets

ROTARY ACTUATOR FOR STEM VALVES

FIELD OF THE INVENTION

The invention relates to a device that opens or closes a valve. More particularly, this invention relates to a rotary actuator that converts rotary motion into linear motion for actuating a valve. Specifically, the invention relates to a device for operating a rising stem valve.

BACKGROUND OF THE INVENTION

Pipes are used to transmit large volumes of fluid. In order to control flow of fluid through these pipes, valves are commonly used at specific points in the piping or between different pipes. The valves used typically include a valve seat and a valve stem moved relative to the valve seat.

The position of the valve stem affects the flow of the fluid through the pipe. In a two-way valve, the flow is restricted when the valve stem is positioned so that a valve disk, a gate, a blocking member or piston is seated in the valve seat. Alternatively, the flow is least restricted when the valve stem is positioned such that the piston is located away from the valve seat. Intermediate positions are also available depending on the position of the valve stem and, hence, the valve disk.

Similarly, in three-way and four-way valves, the position of the valve stem determines the fluid flow. This fluid flow is restricted to flowing along a first path when the piston seats in the first valve seat. Alternatively, the fluid flow is restricted to flowing along a second path when the piston seats in a second valve seat.

For larger pipes, the valve stems are correspondingly large and heavy.

Many prior art devices use rising stem actuators for vertical control of these valve stems. However, vertical movement of these known valve stems often requires great amounts of force and such vertical movement is particularly difficult to implement. A means to substitute, convert, or transfer this force into a lesser force or motion is therefore desired. Thus, there is a need to replace currently available rising stem actuators with an actuator which requires less force input to achieve the same amount of force output as known actuators.

In addition, there is a need for an actuator which has a greater variety of applications than known actuators.

OBJECTS AND SUMMARY OF THE INVENTION

It is an object of the invention to provide an actuator that will easily transfer the vertical force required to move a valve stem.

It is another object of the invention to provide a device that transmits a rotary input motion into a vertical output motion or movement of a valve stem.

It is a further object of the invention to provide a device that is adjustable to yield a range of valve movements and positions.

It is another object of the invention to reduce breakdowns in the field.

It is a still further object of the invention to reduce the number of actuators required to actuate a variety of valves.

It is still a further object of the invention to lessen the force required for operating conventional rising stem actuators.

It is a further object of the invention to use a constant output (e.g., quarter-turn) rotary actuator to yield a variety of different length linear outputs for controlling a variety of different rising stem valves requiring differing lengths of linear movement for valve actuation.

It is an object of the invention to use a smaller motor to control valve movement.

Yet another object of the invention is to avoid the disadvantages of the prior art.

In summary, the present invention is directed to a device for actuating a valve including a body having a slot therein. A pin is positioned within the slot, and the pin is attachable to a valve stem of a valve, whereby when the valve stem is attached to the pin and the pin is moved within the slot, the valve stem moves therewith and actuates the valve.

The present invention is likewise directed to a rotary actuator assembly including a rotary actuator, a body having a chamber therein attached to the actuator, and a valve associated therewith. A slot is provided in part of the chamber, and a pin extends through the slot for guiding movement of the valve stem of the valve when the valve stem is attached to the pin and the rotary actuator is actuated.

Throughout the specification, relative terms such as left, right and vertical are for convenience and are not intended to be limiting.

DESCRIPTION OF THE INVENTION

Figure 1:
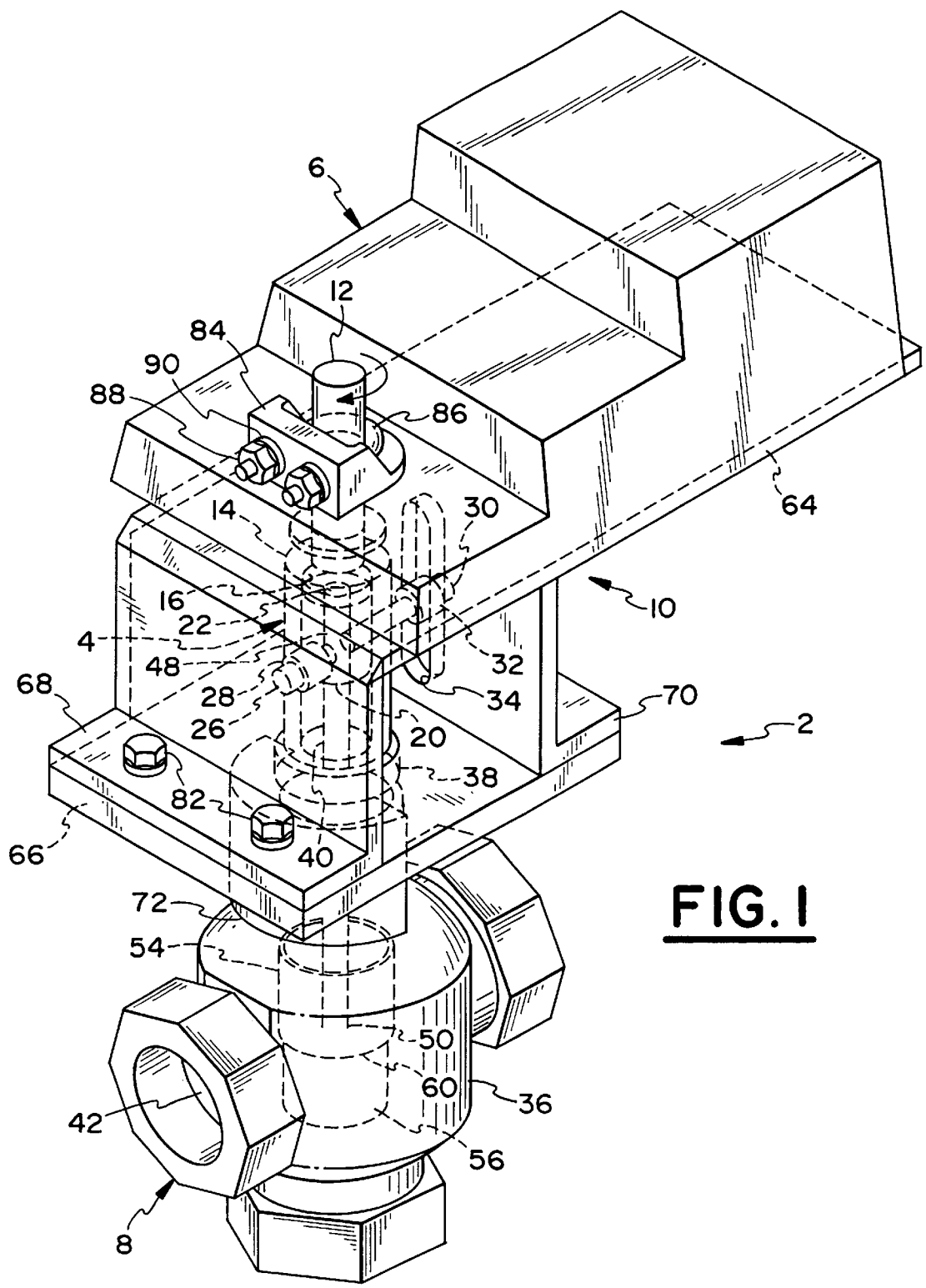
FIG. 1 is a perspective view of a valve stem actuating assembly including a rotary actuator.
Figure 2:
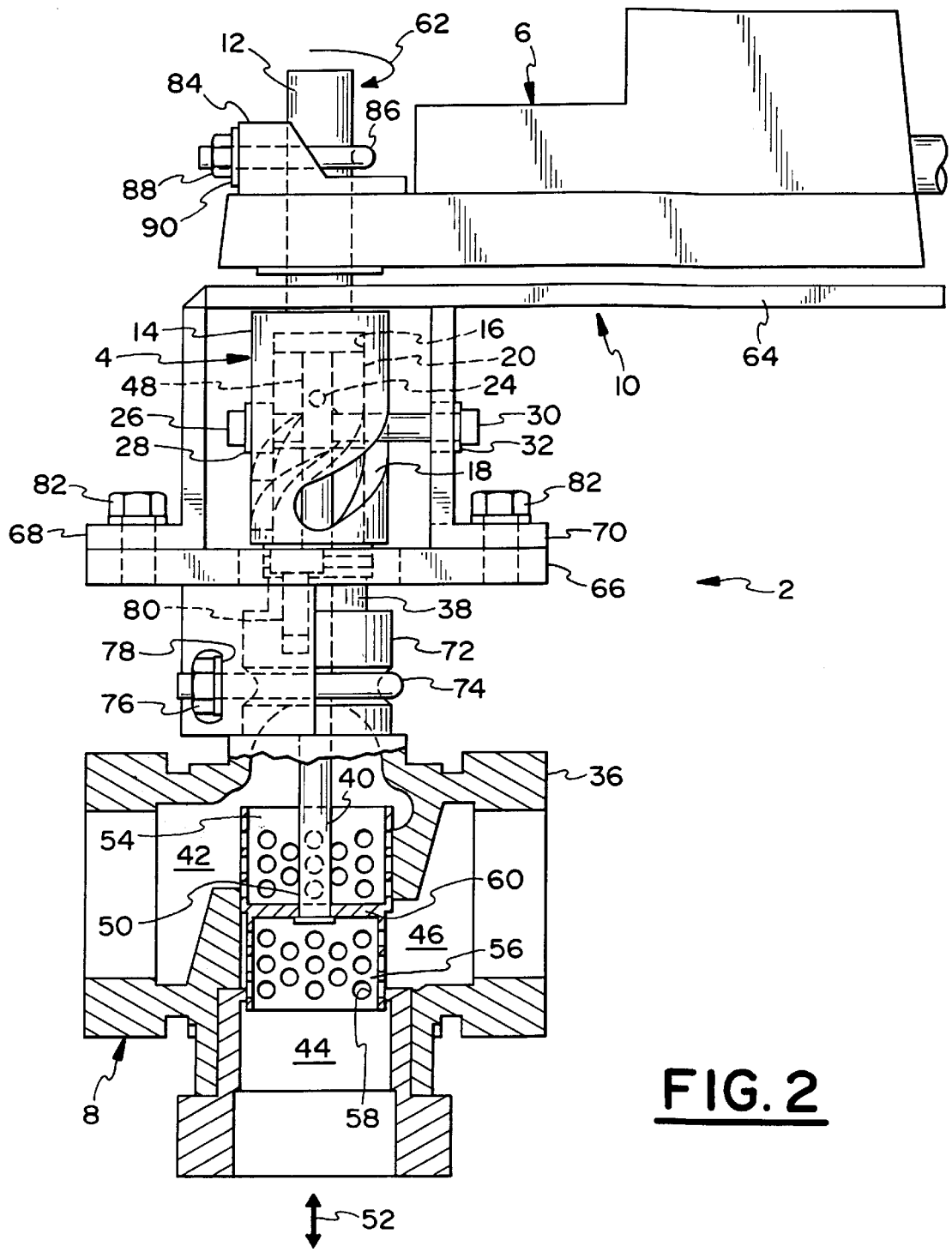
FIG. 2 is a side view of the valve stem actuating assembly shown in FIG. 1.
Figure 3:
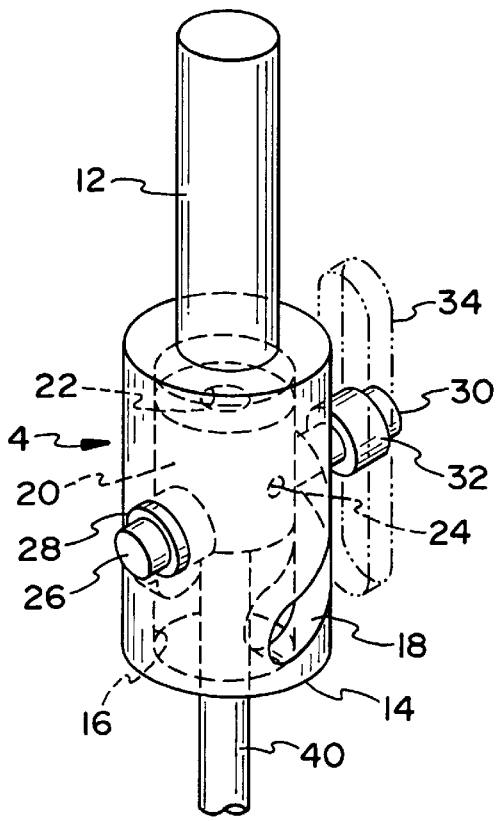
FIG. 3 is a perspective view of the rotary actuator used in the valve stem actuating assembly of FIG. 1.
Figure 4:
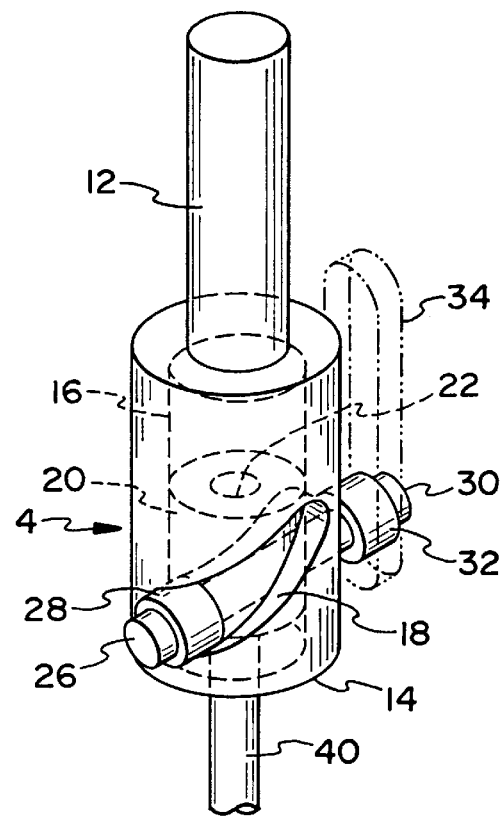
FIG. 4 is a perspective view of the rotary actuator similar to FIG. 3, in a different position.
Figure 5:
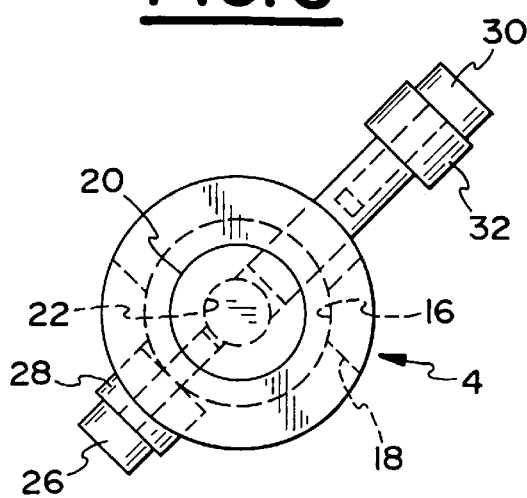
FIG. 5 is a top view of the rotary actuator in FIG. 3.
Figure 6:
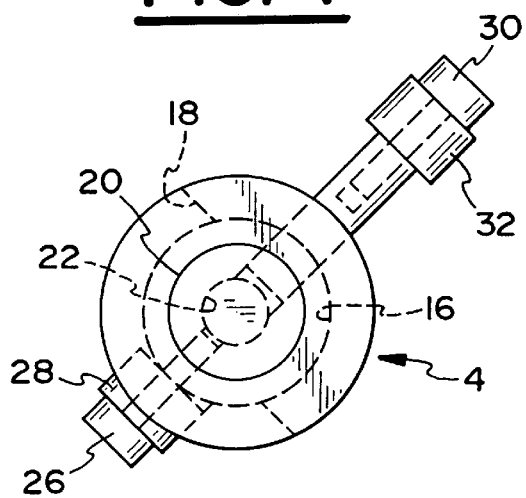
FIG. 6 is a top view of the rotary actuator of FIG. 4.

FIGS. 1 and 2 show respective perspective and side views of a preferred embodiment of a valve stem actuating assembly 2.

The main components of the valve actuating assembly 2 include a rotary actuator 4, an actuator or drive motor 6, such as an electromechanical actuator, as illustrated, a three-way valve 8, and a mounting assembly 10. Each of these components is further discussed in detail below.

The rotary actuator 4 comprises a head portion or drive stem 12 and body or body portion 14. The body portion 14 is hollow with a chamber 16 disposed therein. The body portion 14 includes a helical slot 18 disposed thereon.

The rotary actuator 4 also includes a piston or drive piston 20 slidable within the chamber 16. The piston 20 may include an axial hole 22 and a plurality of side holes 24. A bearing screw, pin or some other connecting structure 26 is inserted into one of the plurality of piston side holes 24. A bearing roller 28 is fitted around pin 26 and disposed in helical slot 18.

A further bearing screw or pin or some other connecting structure 30 is inserted into another one of the plurality of piston side holes 24. A bearing roller 32, similar to the bearing roller 28, is fitted around the stabilizing screw 30 and disposed in a linear slot 34 disposed in the mounting assembly 10. As further discussed below, the bearing roller 32 and piston 20 are typically constrained to move along the path defined by linear slot 34.

The rotary actuator 4 is configured for operating a valve, such as the 3-way valve 8 shown in FIGS. 1 and 2 or other valve configurations, for example, 2-way or 4-way valves.

The 3-way valve 8 generally comprises a valve body 36, a neck portion 38 and a valve stem 40. In 3-way valve 8, the valve body 36 includes a first or left opening 42, a second or right opening 44 and a third or lower opening 46, each of which may be fitted into pipes (not shown).

The valve stem 40 includes a first end 48 and a second end 50. The first end 48 is inserted in the axial hole 22 of the piston 20. Either the bearing screw 26 or the bearing screw 30 may be tightened to lock the first end 48 into the axial hole 22 in order to attach the valve stem 40 to the piston 20. Thus, the valve stroke 52 for the stem 40 is the same as the stroke of piston 20 as piston 20 moves along chamber 16 disposed in the body portion 14 of the rotary actuator 4.

In the embodiment of FIG. 1, an upper filter or anti-cavitation cup 54 and a lower filter or anti-cavitation cup 56 are attached to the second end 38. Each of the upper and lower filter cups 54 and 56 includes a plurality of holes 58 for allowing fluid flow while blocking larger debris and/or reducing cavitation. A disk or valve disk or channel blocking portion 60 is typically provided.

As evident from FIG. 1, the first opening 42 of the 3-way valve 8 is sealed when the disk or valve disk or blocking portion 60 of the valve stem second 50 end is fully raised. This allows fluid flow between the second opening 44 and the third opening 46.

Alternatively, the second opening 44 is sealed when the blocking portion 60 of the valve stem second end 50 is fully lowered, allowing fluid flow between the first opening 42 and third opening 46.

Intermediate positions, providing for restricted flows in multiple channels, are also contemplated.

The second end 50 of the valve stem 40 may be configured to block at least one of the valve openings 42, 44 or 46.

The actuator 6 provides a rotary motion 62 (shown having a clockwise orientation in FIGS. 1 and 2) to the rotary actuator 4.

The actuator 6 provides rotary motion 62 at the head portion 12 of the rotary actuator 4. Upon rotation of the rotary actuator 4, piston 20 is constrained to move within the chamber 16 of the body portion 14. Moreover, the bearing screw 30 and bearing roller 32 further constrain piston 20 to move within linear slot 34, which may be disposed parallel to the chamber 16. Recall that linear slot 34 is fixed relative to rotary actuator 4 as linear slot 34 is defined in a portion of mounting assembly 10.

As the piston 20 is constrained from rotating, when rotary motion 62 is a clockwise motion, bearing roller 28 appears to move counterclockwise. For the helical slot 18 shown in FIGS. 1–6, a clockwise rotation causes the bearing roller 28 to move up the helical slot 18 and raise the piston 20 as well as the connected valve stem 40, while a counterclockwise rotation causes the bearing roller 28 to move down the helical slot 18. Alternatively, a different configuration of the helical slot 18 may cause the bearing roller 28 to move downwardly for a clockwise rotation and upwardly for a counter clockwise rotation.

Therefore, the rotary actuator 4 transfers the rotary input motion 62 from the actuator 6 into the vertical valve stroke motion 52.

Good results have been achieved when rotary actuator 4 is a quarter turn actuator such that a quarter turn or ninety degree turn raises and lowers the piston 20 and corresponding valve stem 40, thereby changing the flow path in valve 8.

The helical slot 18 for a quarter turn actuator may be defined so as to extend over a slightly greater angle than the ninety degree turn, for example, one hundred and ten degrees (i.e., 90°+10°+10°). Those additional 10° angles may be provided at each end of the "90°" helical slot to prevent jarring wear. Namely, so that extra space is provided such that the bearing roller 28 never hits the ends of the helical slot 18.

In addition, the height of the helical slot 18 is designed for a particular desired rise of the valve stem 40. For example, the height of the slot for a ½" stroke rising stem valve may be ½" (with added space at each end to prevent wear). For a 1" rising stem valve, the slot 18 height is 1" plus added length to prevent wear. As will be appreciated, the configuration and "steepness" of the helical slot 18 may be varied substantially, as necessary. Thus, the same quarter turn actuator can be used for opening a ½" vertical rising stem valve as can be used for opening/closing a 1" vertical rising stem valve while maintaining the constant quarter turn (e.g., 90° turning) of the rotary actuator.

The rotary actuator 4 is connected to the actuator 6 and the 3-way valve 8 with mounting assembly 10. This mounting assembly 10 comprises an upper mounting plate 64, a lower mounting plate 66, a left mounting plate 68 and a right mounting plate 70.

The lower mounting plate 66 is configured to receive the neck portion 38 of the 3-way valve 8. A lower support collar 72 provides additional support to this neck portion 38. The lower support collar 72 is grooved such that a lower collar bolt 74, nuts 76 and washers 78, or other securing means, are provided to secure the lower support collar 72 to the neck portion 38. Recessed bolts 80 extend through the lower mounting plate 66 and the neck portion 38 of the 3-way valve 8.

Left and right mounting plates 68 and 70 are provided to support the upper mounting plate 64 on the lower mounting plate 66. Shoulder bolts 82 or other securing means are used to attach the respective front and rear mounting plates 68 and 70 to the lower mounting plate 66. The right mounting plate 70 may include linear slot 34 for receiving the right bearing roller 32. The linear slot 34 is configured such that the bearing roller 32 moves in the same direction as the piston 20 and valve stem 40, as discussed above.

The upper mounting plate 64 is welded or secured in some other manner to the left and right mounting plates 68 and 70. The upper mounting plate 64 is configured to receive the head portion 12 of the rotary actuator 4. The upper plate 62 also supports actuator 6 thereon.

An upper support collar 84 may be positioned on the upper mounting plate 64 to further secure the rotating actuator 4 with the actuator 6. The upper support collar 84 is also configured to receive the head portion 12 of the rotating actuator 4. An upper collar bolt or U-bolt 86 used with nuts 88 and washers 90, or other securing means, secures the head portion 14 to the upper support collar 84.

It is further contemplated that alternate means of converting rotary to linear motion for opening/closing a valve may be used.

For example, instead of varying the length and/or configuration of helical slot 18 as discussed above, it is contemplated that the vertical stroke 52 be varied by varying the number of degrees of rotation of the rotary output of the rotary actuator 4. For example, the embodiment described above uses a quarter (or 90°) turn actuator to achieve various vertical outputs depending on the configuration and/or height/length of helical slot 18 described above while having a rotary input of 45° instead of 90°. In that manner, bearing pin 30 will only go over a portion of the length of helical slot 18 and, hence, only rise over a portion of linear slot 34. Hence, it will be appreciated that bearing pin 30 will move a shorter vertical distance with a 45° rotary input than when there is a 90° rotary input.

Figure 7:
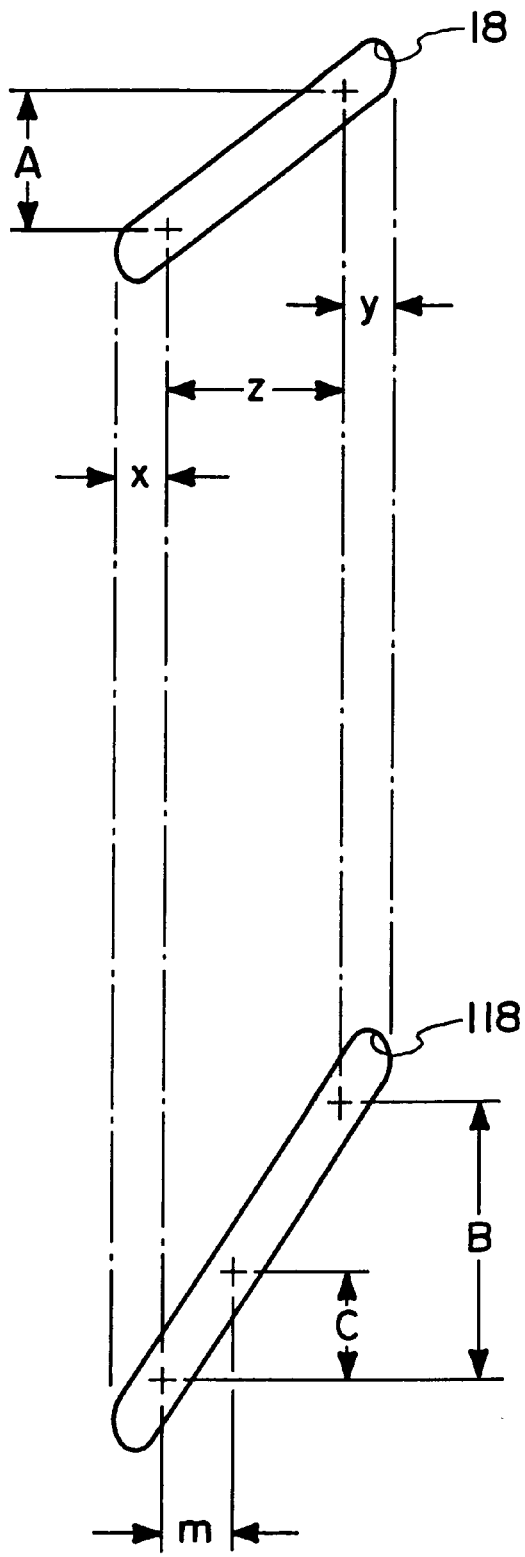
FIG. 7 schematically illustrates two different helical slot configurations.

FIG. 7 illustrates various ways in which the length of vertical stroke 52 can be varied, and amplifies the above discussion. In the schematic FIG. 7 illustration, in the upper half thereof, it is shown how movement of a rotary actuator through an input angle z results in a vertical stroke 52 length A. For example, in the case where angle z equals 90°, length A may equal ½". As described above, it is preferably that space be provided at the ends of slots 18, which space is equivalent to, for example, 10°. Thus, in this example, angle x and angle y would each equal 10°.

By considering the lower half of FIG. 7, in which a helical slot 118 is illustrated having a height about twice that of the height of helical slot 18, it will readily be appreciated how a length B of vertical stroke 52 can be achieved with the same quarter turn actuator being used as the input device. It can be seen that for the same input rotation through angle z (e.g., 90°) the linear (e.g., vertical) movement achieved of length B is about twice that of length A. Thus, one can readily achieve a distance B of about 1", with the same 90° input from the actuator by varying the height of the slot; i.e., by providing body portion 14 with slot 118 instead of slot 18.

Still further, it will be readily appreciated that when there is an input angle m which is less than the input angle z from the rotating actuator, a lower linear distance will be achieved; i.e., a length C will be less than the length B, as shown in FIG. 7.

Still further, the bearing rollers may be made of bronze, brass, and the like, while the bearing pins may be steel rods or screws.

The rotary actuator may be powered by electricity, hydraulic fluid, mechanical actuators, pneumatic systems, and the like.

Contemplated uses include, but are not limited to, cooling valves, petrochemical plants, HVAC systems, and the like, especially when remote-controlled operation of valves is desirable.

While this invention has been described as having a preferred design, it is understood that it is capable of further modification, uses and/or adaptations following in general the principle of the invention and including such departures from the present disclosure as come within known pertains, and as may be applied to the essential features set forth, and fall within the scope of the invention or the limits of the appended claims.

I claim:

1. A rotary actuator assembly, comprising:
   a) a rotary actuator, said rotary actuator including a body, a drive piston, and drive stem;
   b) said drive stem being connectable to a drive motor;
   c) said body including a chamber disposed therein and a slot provided in a portion of said chamber;
   d) said drive piston being movable within said chamber, and said drive piston being attachable to a valve stem of a valve;
   e) a housing disposed adjacent to said rotary actuator, said housing including at least two walls defining an opening therebetween, said housing being disposed externally of a valve when said drive piston is attached to a valve stem of a valve;
   f) said body being disposed at least partially within said opening of said housing;
   g) a guide element provided on one of said at least two walls of said housing, said guide element being disposed externally of a valve when said drive piston is attached to a valve stem of a valve; and
   h) a pin disposed on said drive piston, said pin extending through said slot and engaging said guide element, whereby, when said drive piston is attached to a valve stem of a valve and said rotary actuator rotates, said body rotates, said pin moves along said slot and along said guide element, said drive piston moves the valve stem, and the valve is actuated.

2. A rotary actuator as in claim 1, wherein:
   a) said slot includes a helical slot having first and second ends.

3. A rotary actuator as in claim 1, wherein:
   a) said guide element comprises a slot.

4. A rotary actuator assembly as in claim 1, wherein:
   a) said guide element includes a linear slot provided in said housing; and
   b) at least one roller is provided on said pin, and said at least one roller engages said linear slot.

5. A rotary actuator assembly as in claim 4, wherein:
   a) said linear slot is straight.

6. A rotary actuator assembly as in claim 1, wherein:
   a) said body is disposed substantially completely with said opening defined by said at least two walls of said housing.

7. A rotary actuator assembly as in claim 1, wherein:
   a) a mounting assembly is disposed between said rotary actuator and said valve, said mounting assembly being configured for connecting said rotary actuator to at least one of a variety of different valves.

8. A rotary actuator assembly as in claim 1, wherein:
   a) said valve includes a rising stem valve which operates when said valve stem moves substantially linearly.

9. A rotary actuator assembly as in claim 1, wherein:
   a) said at least two walls of said housing includes only two walls.

10. A valve actuating assembly, comprising:
   a) a drive motor;
   b) a rotary actuator, said rotary actuator including a body, a drive piston, and drive stem;
   c) said drive stem being connected to said drive motor;
   d) said body including a chamber disposed therein and a slot provided in a portion of said chamber;
   e) said drive piston being movable within said chamber, and said drive piston being attachable to a valve stem of a valve;
   f) a housing disposed adjacent to said rotary actuator, said housing including at least two walls defining an opening therebetween, said housing being disposed externally of a valve when said drive piston is attached to a valve stem of a valve;
   g) said body being disposed at least partially within said opening of said housing;
   h) a guide element provided on one of said at least two walls of said housing, said guide element being disposed externally of a valve when said drive piston is attached to a valve stem of a valve; and i) a pin disposed on said drive piston, said pin extending through said slot and engaging said guide element, whereby, when said drive piston is attached to a valve stem of a valve and said rotary actuator rotates, said body rotates, said pin moves along said slot and along said guide element, said drive piston moves the valve stem, and the valve is actuated.

11. A valve actuating assembly as in claim 10, wherein:
a) said guide element comprises a slot.

12. A valve actuating assembly as in claim 10, wherein:
a) said slot includes a helical slot.

13. A valve actuating assembly as in claim 10, wherein:
a) said slot is sized to provide a pre-determined amount of stem rise.

\* \* \* \* \*